(12) United States Patent
Tabata et al.

(10) Patent No.: US 6,826,325 B2
(45) Date of Patent: Nov. 30, 2004

(54) OPTICAL SIGNAL SWITCHING UNIT

(75) Inventors: Seiichiro Tabata, Hyogo (JP); Takashi Mizuochi, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 202 days.

(21) Appl. No.: 10/190,725

(22) Filed: Jul. 9, 2002

(65) Prior Publication Data

US 2003/0142899 A1 Jul. 31, 2003

(30) Foreign Application Priority Data

Jan. 25, 2002 (JP) ....................................... 2002-016679

(51) Int. Cl.[7] .................................................. G02B 6/26
(52) U.S. Cl. ....................................................... 385/17
(58) Field of Search ............................... 385/16, 17, 18

(56) References Cited

U.S. PATENT DOCUMENTS 6,160,928 A * 12/2000 Schroeder .................... 385/18
6,542,657 B2 * 4/2003 Anderson .................... 385/18
2002/0071628 A1 * 6/2002 Zang et al. .................... 385/17

FOREIGN PATENT DOCUMENTS

JP  61-132918  6/1986
JP  2000-13315  1/2000

* cited by examiner

Primary Examiner—Thien M. Le
Assistant Examiner—April Taylor
(74) Attorney, Agent, or Firm—Leydig, Voit & Mayer, Ltd.

(57) ABSTRACT

An optical signal switching unit causing no instantaneous cutoff in switching without a latency time. The optical signal switching unit has input waveguides and output waveguides, optical switches for switching the course of each optical signal, located at intersections between the waveguides and outputting the optical signal to the output waveguides. This optical signal switching unit includes optical switches and a switch state control part controlling the states of the optical switches, thereby controlling formation of the output optical signal. The optical switches take binary states including a first route state providing the optical signal with a first course and a second course state providing the optical signal with a second course, and an intermediate state including part of both of the first and second course states.

13 Claims, 8 Drawing Sheets

FIG.2A OPTICAL SWITCH (1,1)
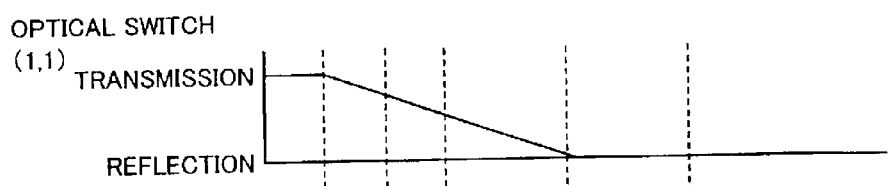
FIG.2B OPTICAL SWITCH (2,1)
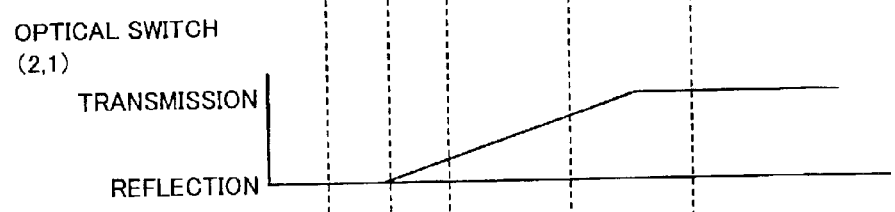
FIG.2C OPTICAL SWITCH (2,2)
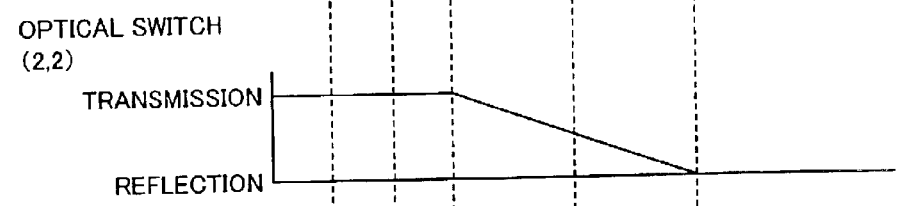
FIG.2D
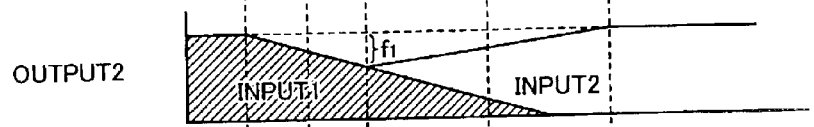
FIG.2E
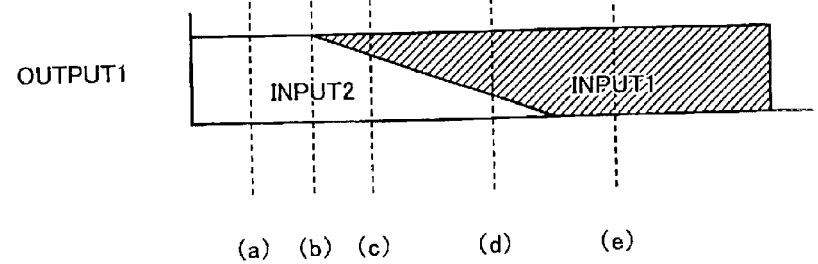

OPTICAL SIGNAL SWITCHING UNIT

BACKGROUND OF THE INVENTION

1. Field of the Invention

The present invention relates to an optical signal switching unit comprising optical switches employed for optical communication.

2. Description of the Background Art

An optical transmission system is widely employed as a transmission line in communication on the Internet. This optical transmission system is formed by an optical fiber member employed as a transmission line for light and various types of electronic devices including an optical device. The optical transmission system transmits mass data through a single optical fiber member, and hence a fault caused in the transmission line has a tremendous influence. Therefore, the optical transmission system must be highly reliable, and have a spare transmission line for preliminarily performing optical transmission following development of a fault. In general, the main transmission line developing a fault is switched to the spare transmission line with an electric signal, and the spare transmission line is switched to the main transmission line when the same is restored to the normal state.

An optical signal switching unit employing optical switches implements high reliability of the optical transmission system. The optical signal switching unit processes parts, such as switching to the spare transmission line, generally processed with an electric signal, with an optical signal for switching from the spare transmission line to the main transmission line upon restoration to the normal state. When such an optical signal switching unit is introduced, the network of the optical transmission system is so simplified that various types of electronic devices employed for the optical transmission system can be miniaturized, improving economy.

The aforementioned optical transmission system employs a device consisting of an optical signal monitor, the optical signal switching unit and a control part for changing the states of optical switches when the optical signal monitor detects disconnection of an optical signal for automatically restoring the transmission line to the normal state.

As shown in FIG. 8, optical switches 111 employed in a conventional optical signal switching unit are provided for optical waveguides 105 of polymer films 102 formed by waveguide storage sheets pressed by keep plates 103. As shown in FIG. 9, the waveguide storage sheets 102 bring notch end surfaces 102a into close contact with each other on notches in a passing state (hereinafter referred to as an ON state) implemented by not pressing a driving mechanism (push rod) 106 provided on an intersection between the waveguides 105. Therefore, cores forming the waveguides 105 are also in close contact with each other on the notches. Thus, light reaching the notches brought into close contact with each other passes through the notches as such.

In a course changing state or a reflecting state (hereinafter referred to as OFF state) implemented by pressing the push rod 106, the push rod 106 pushes the notch end surfaces 102a upward and separates the same from each other for bringing the notch end surfaces 102a into contact with the air, as shown in FIG. 10. Therefore, light propagated through the waveguides 105 having a high refractive index cannot exit from the notch end surfaces 102a but is totally reflected by an air space in a clearance 109 and propagated while changing the traveling direction by about 90°.

According to the aforementioned mechanism, input light components L1 and L2 continuously pass through portions where the notch end surfaces 102a are in close contact with each other on the intersections between the waveguides 105 when optical connection is in an ON state on the intersections between the waveguides 105, as shown in FIG. 8. When the optical connection is in an OFF state in the intersections between the waveguides 105, on the other hand, both of the input light components L1 and L2 are totally reflected by the optical switches 111 and output in a prescribed direction while changing the traveling direction by about 90°. As hereinabove described, the feature of the conventional optical switches 111 resides in that the destination of the light is switched by pressing/pulling the single push rod 106.

However, all of the aforementioned optical switches 111 can take only binary states, i.e., the ON and OFF states. When the states of the optical switches 111 are changed as described above, therefore, the optical signal is instantaneously cut off following this change. In this case, the optical signal monitor determines that the optical signal is disconnected. In other words, the optical signal monitor falsely recognizes the optical signal as disconnected when the states of the optical switches 111 are simply changed, due to the instantaneous cutoff of the optical signal following the operation of changing the states of the optical switches 111.

When a light amplifier is arranged at the bark of the optical switches 111, such instantaneous cutoff of the optical signal caused by the optical switches 111 may cause an optical surge in the light amplifier and damage another optical element, such as a photoreceptor. In a proposed countermeasure, therefore, a constant latency time is provided between a time detecting cutoff of an optical signal and a time switching the optical signal (Japanese Patent Laying-Open No. 2000-13315).

When such a latency time is provided, however, network switching is undesirably delayed.

SUMMARY OF THE INVENTION

An object of the present invention is to provide an optical signal switching unit causing no instantaneous cutoff in switching without providing a latency time.

The optical signal switching unit according to the present invention has a plurality of input waveguides and a plurality of output waveguides for switching courses of each optical signal input in the input waveguides on intersections between the input waveguides and the output waveguides and outputting the optical signal to the output waveguides. This optical signal switching unit comprises a plurality of optical switches arranged on the intersections for switching courses of the optical signal and a switch state control part controlling the states of the plurality of optical switches thereby controlling formation of the output optical signal. The optical signals take binary states including a first course state providing the optical signal with a first course and a second course state providing the optical signal with a second course different from the first course as well as an intermediate state partially including both of the binary states.

According to this structure, an output from any output waveguide connected to an optical signal monitor, for example, can be prevented from reaching zero without providing a latency time or the like when forming an output optical signal from an input optical signal by the optical switches. When all optical switches are in the intermediate state, for example, the output from the output waveguide does not reach zero. When all optical switches are set to either one of the said prescribed binary states while maintaining the intermediate state and approaching the state of each optical switch to a prescribed one of the binary states, switching can be performed without reducing the output to zero. Therefore, the optical signal monitor makes no false recognition of disconnection or the like, and no optical surge is caused in an optical amplifier or the like provided on an output side.

When the aforementioned two types of waveguides are linear waveguides, for example, the aforementioned first course state of the optical switches is a passing state passing the optical signal as such, and the second course state corresponds to a course changing state changing the course of the optical signal to a direction intersecting with the direction of propagation thereof. The aforementioned switch state control part may have a structure capable of continuously controlling not only the aforementioned binary states but also the ratio of the binary states in the intermediate state, or a structure capable of discretely selecting and controlling only a specific ratio, as a matter of course.

The switch state control part can control the states of the plurality of optical switches to cause no zero signal in an output waveguide connected to an optical signal monitor monitoring the output signal.

According to this structure, the optical signal monitor makes no false recognition of disconnection, and no optical surge is caused in a light amplifier provided in a rear stage.

All output waveguides provided on the optical signal switching unit or a single arbitrary output waveguide may be connected to the optical signal monitor.

The switch state control part can vary an inter-state transfer rate for changing the states of optical switches with every optical switch.

According to this structure, the period of the intermediate state of each optical switch can be arbitrarily adjusted while shifting the times for starting changing the states of the respective optical switches. Consequently, the magnitude of fall of an output value can be readily controlled when switching a specific output waveguide.

The inter-state transfer rate can be increased along the order of changing the states of the plurality of optical switches.

Also according to this structure, a redundancy time for the intermediate state between the optical switches can be increased for further reducing fall of an output value following switching in the output waveguide. Further, an output to the output waveguide can be readily prevented from reaching zero.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1A shows light output from an input terminal INPUT1 to an output terminal OUTPUT2 and light output from an input terminal INPUT2 to an output terminal OUTPUT1, FIG. 1E shows light output from the input terminal INPUT1 to the output terminal OUTPUT1 and light output from the input terminal INPUT2 to the output terminal OUTPUT2, and FIGS. 1B, 1C and 1D show transient states shifting from the state shown in FIG. 1A to that shown in FIG. 1E without reducing the outputs from the output terminals OUTPUT1 and OUTPUT2 to zero.

FIGS. 2A to 2E are timing charts showing temporal transition of states of optical switches (1,1), (2,1) and (2,2) on lattice points in the matrix switches shown in FIGS. 1A to 1E and the outputs from the output terminals OUTPUT2 and OUTPUT1. FIG. 2A shows the state of the optical switch (1,1), FIG. 2B shows the state of the optical switch (2,1), FIG. 2C shows the state of the optical switch (2,2), FIG. 2D shows the output of the output terminal OUTPUT2, and FIG. 2E shows the output of the output terminal OUTPUT1.

FIG. 3A shows the state of the optical switch (1,1), FIG. 3B shows the state of the optical switch (2,1), FIG. 3C shows the state of the optical switch (2,2), FIG. 3D shows the output of the output terminal OUTPUT2, and FIG. 3E shows the output of the output terminal OUTPUT1.

FIG. 4A shows the state of the optical switch (1,1), FIG. 4B shows the state of the optical switch (2,1), FIG. 4C shows the state of the optical switch (2,2), FIG. 4D shows the output of the output terminal OUTPUT2, and FIG. 4E shows the output of the output terminal OUTPUT1.

DESCRIPTION OF THE PREFERRED EMBODIMENTS

Embodiments of the present invention are now described with reference to the drawings.

(First Embodiment)

Figure 1A:
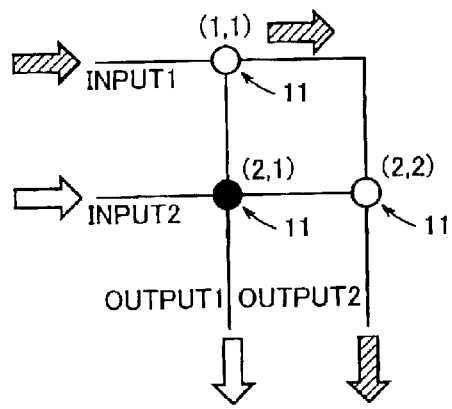
FIGS. 1A to 1E show a switching process in matrix switches according to a first embodiment of the present invention.

FIGS. 1A to 1E show a switching process of optical switches 11 in an optical signal switching unit according to a first embodiment of the present invention. The optical switches 11 according to this embodiment are matrix switches of two rows and two columns (2 by 2). In the following description, lattice points may be referred to in the meaning of optical switches. The optical switches 11 can output inputs from two input terminals INPUT1 and INPUT2 to two output terminals OUTPUT1 and OUTPUT2. Referring to FIG. 1A, the optical switches 11 output light components input in the input terminals INPUT1 and INPUT2 to the output terminals OUTPUT2 and OUTPUT1 respectively. Referring to FIG. 1A, hatched arrows show the light component input in the input terminal INPUT1 while void arrows show the light component input in the input terminal INPUT2.

Figure 1D:
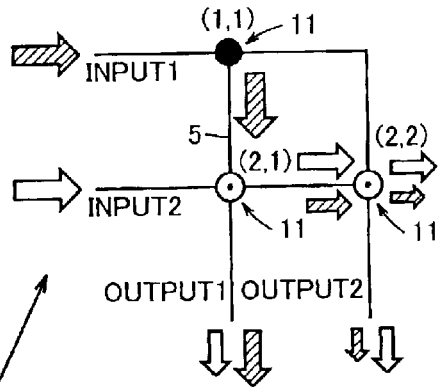
Figure 1B:
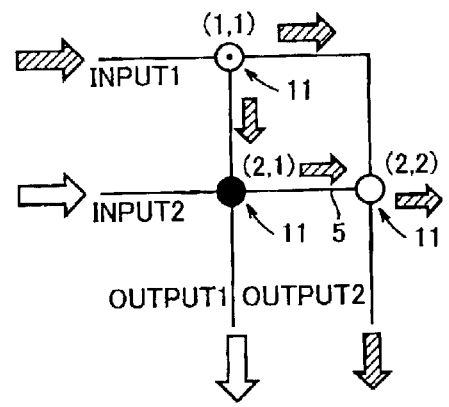
Figure 1E:
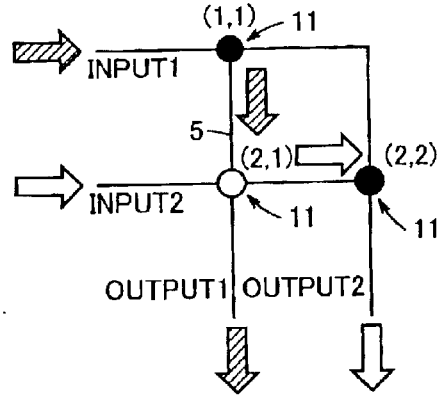
Figure 1C:
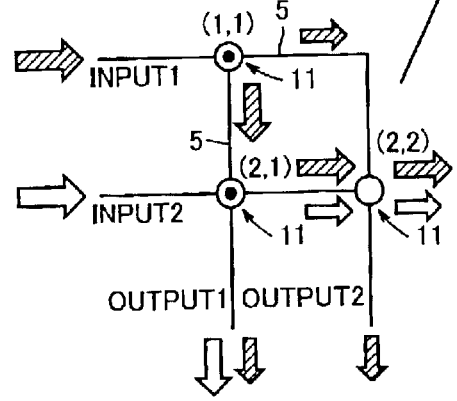
Figure 3A:
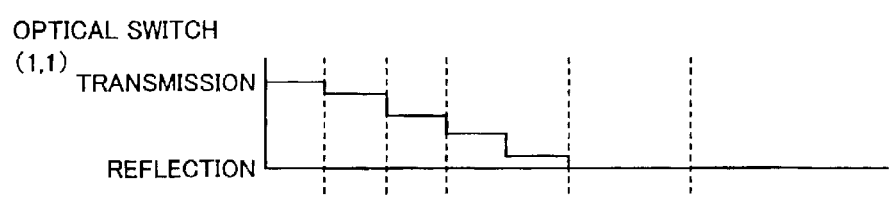
FIGS. 3A to 3E are timing charts showing temporal transition of states of the optical switches (1,1), (2,1) and (2,2) and outputs of the output terminals OUTPUT2 and OUTPUT1 with reference to the matrix switches making stepwise response.
Figure 3B:
Figure 3C:
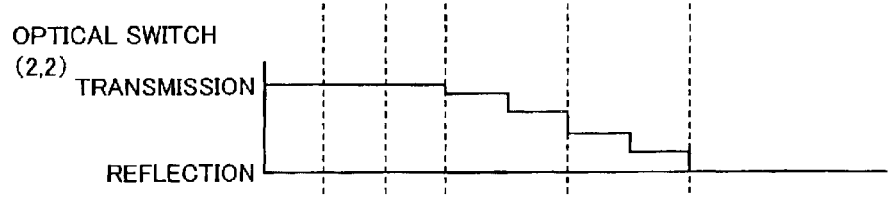
Figure 3D:
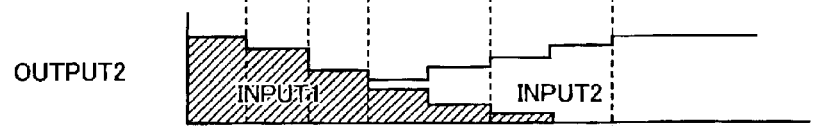
Figure 3E:
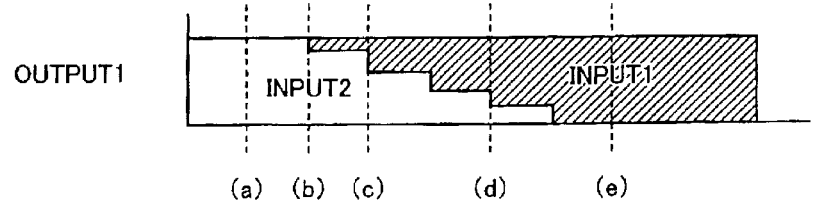

Referring to FIG. 1E, the optical switches 11 output light components input in the input terminals INPUT1 and INPUT2 to the output terminals OUTPUT1 and OUTPUT2 respectively. Therefore, the same light components are reversely output in the states shown in FIGS. 1A and 1E. FIGS. 1B to 1D show a contrivance for preventing instantaneous cutoff of the light components when switching the state shown in FIG. 1A to that shown in FIG. 1E. In other words, an intermediate state, i.e., a function of transient response is provided for changing the optical switches 11 from a passing state corresponding to a first course state to a course changing state (reflecting state), i.e., a second course state. Further, another optical switch 11 starts changing its state before an optical switch 11 initially starting changing its state completely changes the state. FIGS. 1B to 1D show the ratios of the course changing state (reflecting state) with black circles in white circles.

Referring to FIG. 1A, an optical switch (1,1) starts changing its state from an ON state. Referring to FIG. 1B, the optical switch (1,1) changes its state from a passing state to a state slightly causing reflection. Therefore, the light output from the input terminal INPUT1 to the output terminal OUTPUT2 is weakened. On the other hand, light reflected by the optical switch (1,1) is reflected by an optical switch (2,1) still in a reflecting state, to pass through an optical switch (2,2). The optical switch (2,1) starts changing its state in FIG. 1B.

Referring to FIG. 1C, the component of the passing state is weakened and the ratio of the reflecting state is increased in the optical switch (1,1). The optical switch (2,1) increases the ratio of the passing state from the reflecting state, and starts to slightly pass the light. Therefore, the light output from the input terminal INPUT1 to the output terminal OUTPUT2 is further weakened while the light reflected by the optical switch (1,1) slightly passes through the optical switch (2,1) and starts to be output from the output terminal OUTPUT1. The light output from the input terminal INPUT2 to the output terminal OUTPUT1 is weakened. However, the light from the input terminal INPUT2 passing through the optical switch (2,1) passes through the optical switch (2,2) still remaining in the passing state. At this point of time, the optical switch (2,2) starts changing its state, increases the ratio of a reflecting state and reduces the ratio of the passing state.

Referring to FIG. 1D, the optical switch (1,1) completely changes to the reflecting state. The optical switch (2,1) further increases the ratio of the passing state, and the light output from the input terminal INPUT1 to the output terminal OUTPUT1 is strengthened. On the other hand, the light from the input terminal INPUT2 is partially reflected and output from the output terminal OUTPUT1, while the remaining part of this light is passed and reflected by the optical switch (2,2), and starts to be output to the output terminal OUTPUT2.

Finally, all switching is completed in FIG. 1E.

FIGS. 2A to 2E are timing charts showing the relation between temporal transition of the state of each optical switch and outputs from the output terminals OUTPUT1 and OUTPUT2. Each optical switch starts changing its state with time difference. However, the optical switch (2,2) finally starting changing its state starts changing the state before the optical switch (1,1) initially starting changing its state completely changes the state. The outputs from the output terminals OUTPUT1 and OUTPUT2 are switched while gradually changing the ratio of the light components from the input terminals INPUT1 and INPUT2, and the light outputs do not reach zero.

While the ratio between passage and reflection in the intermediate state, i.e., the component of transient response linearly changes with respect to time in the above description, the aforementioned component of the transient response may alternatively nonlinearly change with respect to time. Further, the transient response component may stepwisely change as shown in FIGS. 3A to 3E.

In the aforementioned matrix switches, each optical switch is provided with the intermediate state, i.e., the component of transient response between the passing state and the reflecting state. Further, another optical switch starts changing its state before the optical switch initially starting changing its state completely changes the state, whereby switching can be implemented without interrupting light between the output terminals OUTPUT1 and OUTPUT2. Consequently, switching can be performed with no false recognition of disconnection in an optical signal monitor without providing a latency time.

(Second Embodiment)

FIGS. 4A to 4E are timing charts showing ratios of passage and reflection in intermediate states of respective optical switches and outputs in matrix switches according to a second embodiment of the present invention. According to this embodiment, the transient response speed of an optical switch initially starting changing its state is reduced while the transient response speed of an optical switch finally starting changing its state is increased. Therefore, the optical switch initially starting changing its state requires a long time for completely switching components, while the optical switch finally starting changing its state completely changes the state in a shorter time.

Figure 4A:
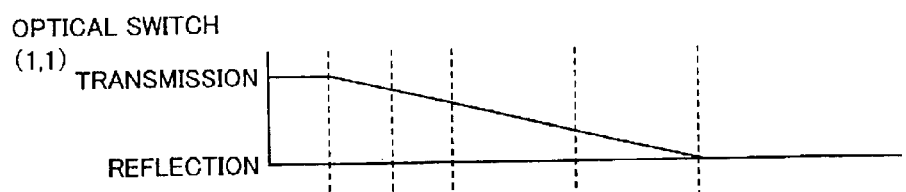
FIGS. 4A to 4E are timing charts showing temporal transition of states of optical switches (1,1), (2,1) and (2,2) and outputs from output terminals OUTPUT2 and OUTPUT1 in a second embodiment of the present invention.
Figure 4B:
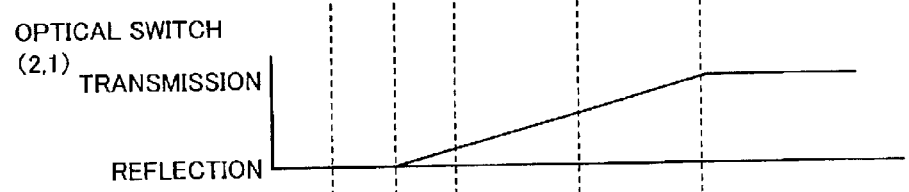
Figure 4C:
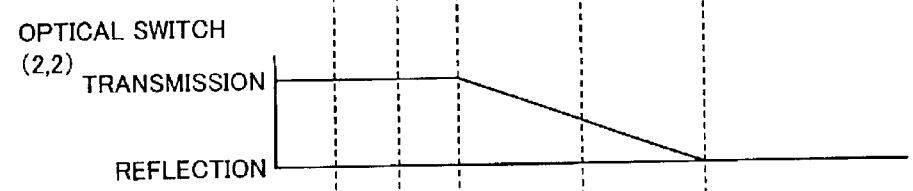

Comparing FIGS. 4A and 4C with each other, an optical switch (2,2) finally starting changing its state completely changes the state when an optical switch (1,1) initially starting changing its state completely changes the state. Further, an optical switch (2,1) subsequently starting changing its state also completely changes the state along with the remaining optical switches (1,1) and (2,2).

Comparing FIGS. 2A and 2C with each other, on the other hand, the optical switch (1,1) already completely changes its state before the optical switch (2,2) completely changes its state.

Figure 4D:
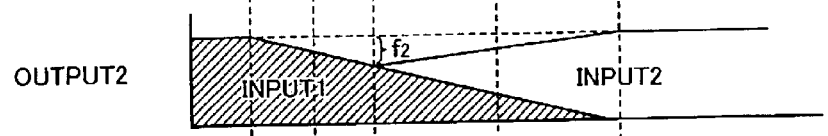
Figure 4E:
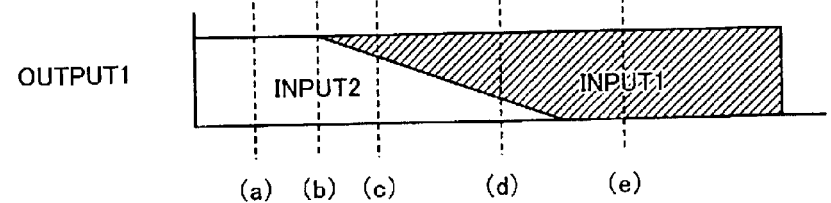

As to fall of optical signal strength to the minimum value at the output terminal OUTPUT2, fall strength f2 in the second embodiment is smaller than fall strength f1 in the first embodiment, as understood from FIGS. 4D and 2D. In other words, the minimum light intensity during switching of the output terminal OUTPUT2 in the second embodiment is higher than that in the first embodiment, and in a state not approaching instantaneous cutoff. Therefore, switching can be performed with a less possibility of false recognition in an optical signal monitor.

The fall of the light intensity during switching of the output terminal OUTPUT2 is reduced in the second embodiment for the following reason: The response speed of the optical switch (1,1) initially changing its state is delayed for increasing the response time thereby increasing the time of superposition with the response times of the optical switches (2,1) and (2,2). The response times of the optical switches (1,1), (2,1) and (2,2) on respective lattice points can be controlled by controlling the time constant of a circuit applying a voltage to each optical switch.

(Third Embodiment)

Figure 5:
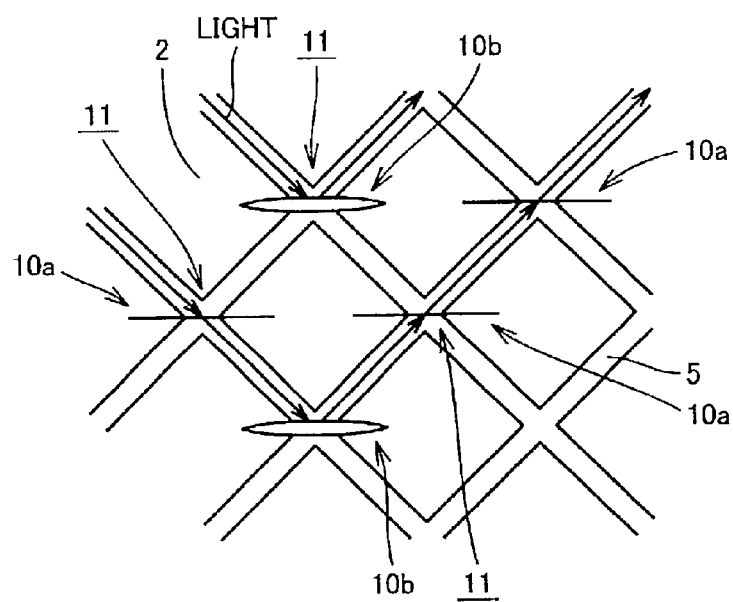
FIG. 5 illustrates an optical signal switching unit according to a third embodiment of the present invention.
Figure 6:
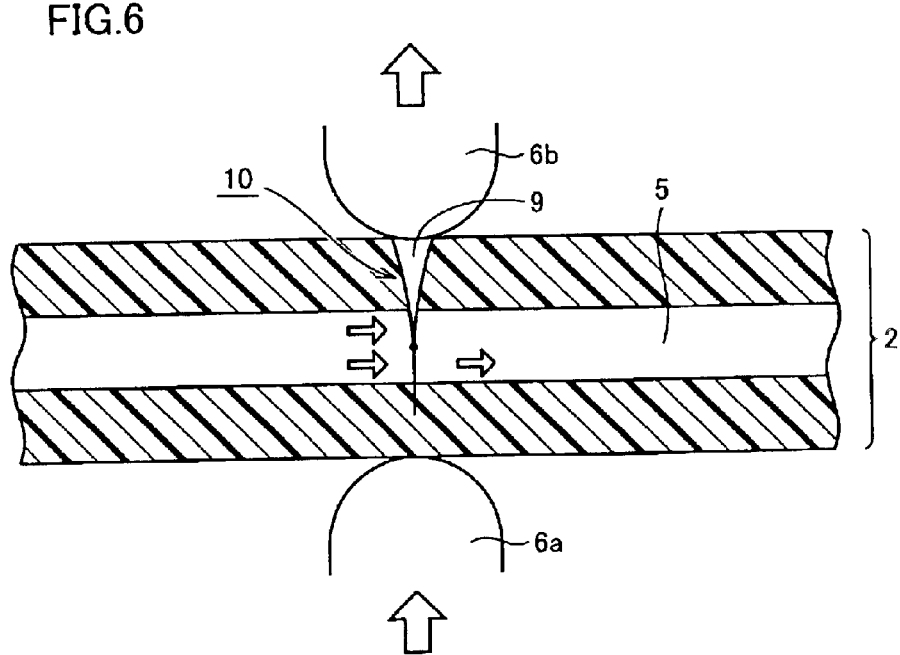
FIG. 6 is a sectional view showing a transient state of an optical switch in the optical signal switching unit shown in FIG. 5.
Figure 7:
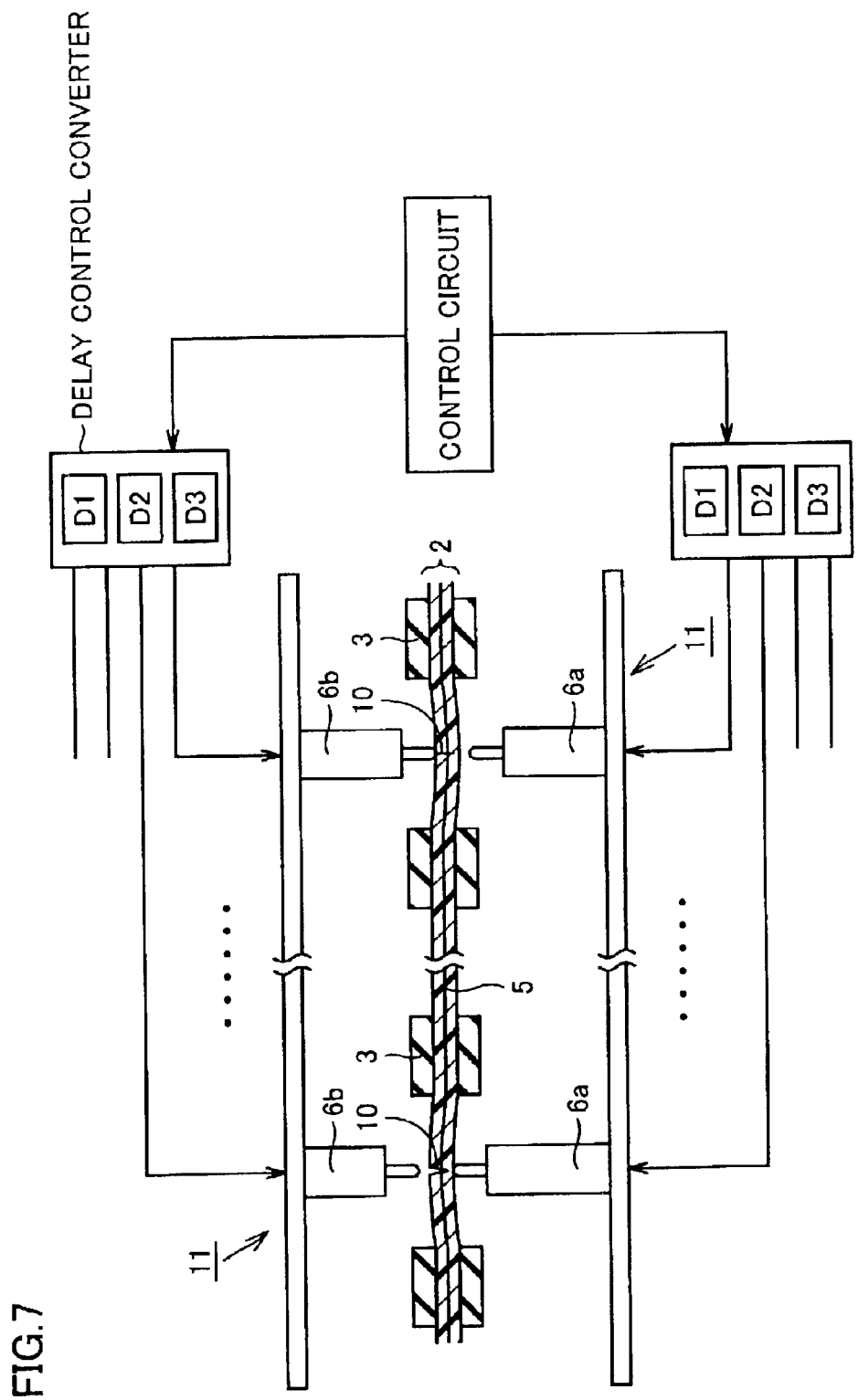
FIG. 7 is a schematic block diagram of the optical signal switching unit according to the third embodiment of the present invention.
Figure 8:
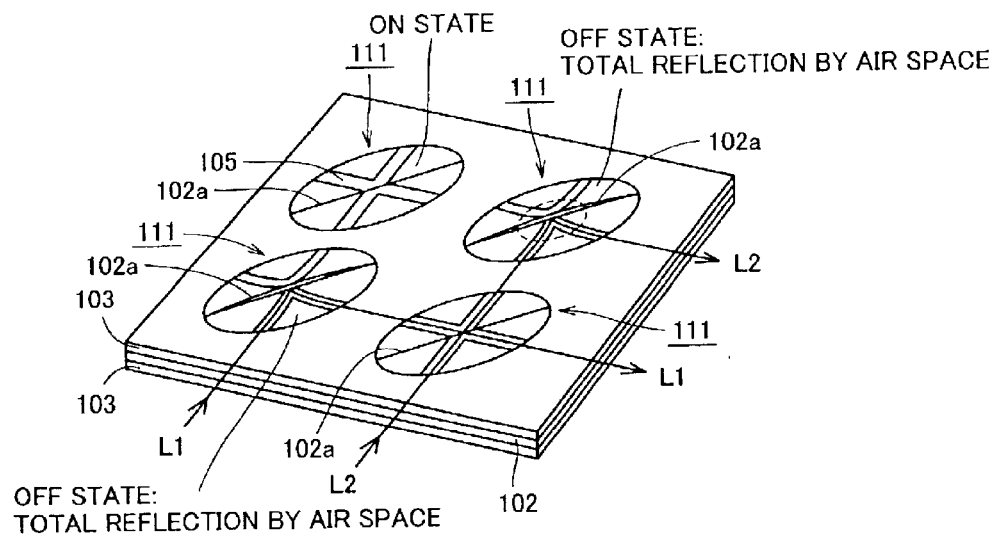
FIG. 8 schematically shows conventional optical switches.
Figure 9:
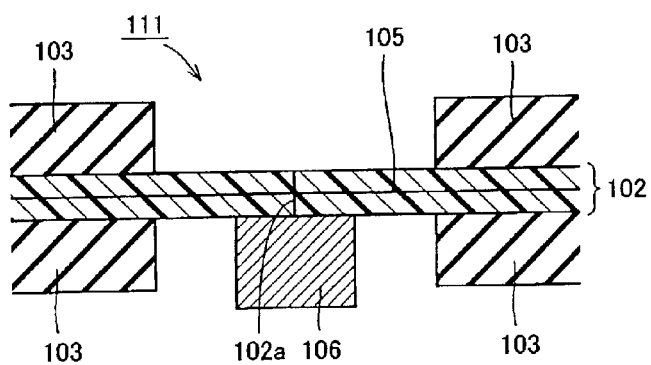
FIG. 9 shows a passing state (ON state) in the conventional optical switches.
Figure 10:
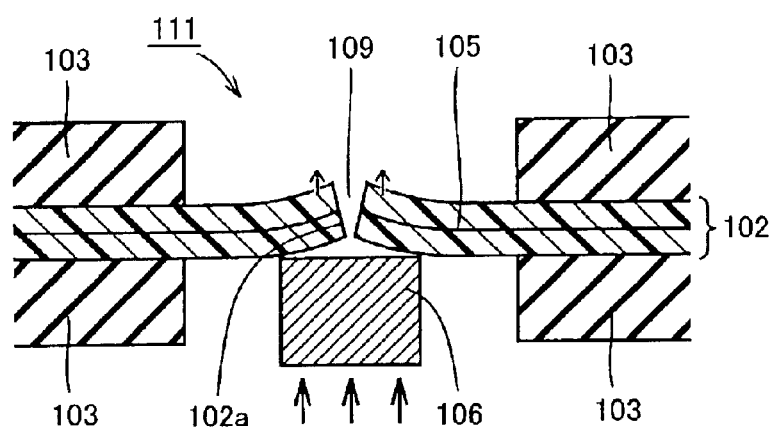
FIG. 10 illustrates a course changing state (OFF state) in the conventional optical switches.

FIGS. 5 to 7 illustrate optical switches according to a third embodiment of the present invention. According to this embodiment, a waveguide storage sheet is formed by a polyimide film, and waveguides are vertically and transversely arranged in the polyimide film. Notches are diagonally formed on the intersections between the waveguides, as shown in FIG. 5. The traveling direction of light is switched by opening/closing the notches. Light passing through the waveguides rectilinearly propagates as such when the notches are closed, while the light is totally reflected by an air space and rectangularly bends its course when the notches are open.

In order to open/close the notches, driving members such as piezo-actuators are employed for pressing/deforming the polyimide film. The aforementioned notches correspond to the optical switches or the lattice points described with reference to the first and second embodiments.

The feature of each optical switch according to this embodiment resides in that an intermediate state is intentionally utilized when opening/closing the notch. FIG. 6 is a sectional view showing such an intermediate state of the optical switch. The waveguide stored in the polyimide film can take the intermediate state including a partial passing state (close contact state) and a remaining reflecting state (separation state) between a passing state and a reflecting state. Light reaching the part of the close contact state passes through this part as such. However, light reaching the part of the separation state is totally reflected by an air space and changes its traveling direction by 90°. In the aforementioned waveguide, the ratio between the thicknesses of the parts of the dose contact state and the separation state is equal to the ratio between the passing state and the reflecting state.

Referring to FIG. 6, the optical switch is in the process of transition from the passing state (total contact state) to the reflecting state (total separation state). While both driving members provided above and under the notch are in contact with the polyimide film for controlling the degree of opening of the notch in this state as shown in FIG. 6, the upper driving member may not be in contact with the polyimide film. When both of the upper and lower driving members are brought into contact with the polyimide film for controlling the degree of opening also in the aforementioned stage, however, the control precision can be improved.

In order to utilize such a transient state, a circuit must be provided for controlling movement of the driving members such as piezo-actuators. As shown in FIG. 7, the piezo-actuators are connected with delay control converters, all of which are controlled by a control circuit. The traveling speed of he piezo-actuators can be controlled for utilizing the transient state by working the piezo-actuators with such combination of the control circuit and the delay control converters. Consequently, switching can be performed without causing a state of zero optical output resulting in false recognition of disconnection by an optical signal monitor when the optical switch changes its state. This switching requires no latency time, whereby network switching is not delayed.

While the embodiments of the present invention have been described in the above, the embodiments disclosed in the above are merely illustrative and the scope of the present invention is not restricted to these embodiments. For example, each optical switch employed in the inventive optical signal switching unit is not restricted to the type changing the course of light by opening/closing a notch but may alternatively be formed by a waveguide optical switch employing a thermooptic effect or an optical switch provided with matching oil on a waveguide intersection.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical signal switching unit having:
   a plurality of input waveguides for receiving optical signals and a plurality of output waveguides for outputting optical signals input to said input waveguides, said input waveguides and said output waveguides intersecting each other at respective intersections;
   a plurality of optical switches located at respective intersections of said input and output waveguides for switching courses for transmission of the optical signal between respective input and output waveguides, each of said optical switches being switchable between a first course state providing a first course for transmission of the optical signal, a second course state providing a second course for transmission of the optical signal, and an intermediate state providing both of the first course and the second course for transmission of the optical signal; and
   a switch state control part controlling states of said plurality of optical switches, thereby controlling which of said output waveguides output an optical signal input to respective input waveguides.

2. The optical signal switching unit according to claim 1, wherein said switch state control part controls the states of said plurality of optical switches so no zero signal is output in an output waveguide connected to an optical signal monitor monitoring the signal output.

3. The optical signal switching unit according to claim 1, wherein said optical switches can take the intermediate state, stepwise, including both of the first and second course states in a prescribed ratio, between the first course state and the second course state, and said switch state control part can control said optical switches through the intermediate state, stepwise.

4. The optical signal switching unit according to claim 1, wherein said input waveguides are arranged along a first direction and said output waveguides are arranged along a second direction that is perpendicular to the first direction.

5. The optical signal switching unit according to claim 1, wherein
   said optical switches are located in a film,
   the optical signal switching unit further includes notches diagonally traversing the intersections inclusive of said film, and pressing members located on opposite sides of the notches for opening and closing the notches, and
   said switch state control part controls movement of said pressing members.

6. The optical signal switching unit according to claim 1, wherein said switch state control part, in the switching, starts changing the state of at least one of said optical switches before completely changing the state of an optical switch that is changing state, among said optical switches.

7. The optical signal switching unit according to claim 1, wherein said switch state control part varies an inter-state transfer rate for changing the states of said optical switches, for all of said optical switches.

8. The optical signal switching unit according to claim 7, wherein the inter-state transfer rate is increased by changing the states of said plurality of optical switches.

9. The optical signal switching unit according to claim 1, wherein said switch state control part selects, in order, the first course state, the intermediate state, and the second course state when said switch state control part switches an optical switch from the first course state to the second course state.

10. An optical signal switching unit having:
   a plurality of input waveguides for receiving optical signals and a plurality of output waveguides for outputting optical signals input to said input waveguides, said input waveguides and said output waveguides intersecting each other at respective intersections;
   a plurality of optical switches located at respective intersections of said input and output waveguides for switching optical paths for transmission of the optical signal; and
   a switch state control part controlling said optical switches, selecting at least one optical path between said input waveguides and said output waveguides, including a first optical path from a first of said input waveguides to a first of said output waveguides, a second optical path from the first of said input waveguides to a second of said output waveguides, and a third optical path including both of the first and second optical paths.

11. The optical switching unit according to claim 10, wherein said switch state control part selects, in order, the first optical path, the third optical path, and the second optical path when said switch state control part switches an optical signal from transmission through the first optical path to transmission through the second optical path.

12. The optical signal switching unit according to claim 10, wherein
   said optical switches are located in a film,
   the optical signal switching unit further includes notches diagonally traversing the intersections inclusive of said film, and pressing members located on opposite sides of the notches for opening and closing the notches, and
   said switch state control part controls movement of said pressing members.

13. An optical signal switching method comprising:
   closing a first optical path from an input waveguide to a first output waveguide, opening a second optical path from the input waveguide to a second output waveguide, and transmitting the optical signal only through the first optical path;
   opening the first optical path, closing the second optical path, and transmitting the optical signal only through second optical path; and
   partially closing the first optical path, partially closing the second optical path, and transmitting of the optical signal through the first and second optical paths, simultaneously.

* * * * *